United States Patent [19]

Reyes

[11] Patent Number: 4,805,285
[45] Date of Patent: Feb. 21, 1989

[54] METHOD OF CHANGING INJECTION MOLDS

[75] Inventor: Jose L. Reyes, Monterrey, Mexico

[73] Assignee: Carol S. Morency, Rochester, Mich.

[21] Appl. No.: 16,571

[22] Filed: Feb. 19, 1987

[51] Int. Cl.$^4$ .................................................. B23Q 17/22
[52] U.S. Cl. .................................... 29/407; 29/426.3; 425/186; 425/193
[58] Field of Search ............... 29/407, 402.03, 402.08, 29/426.3; 164/137, 339, 342; 425/182, 190, 195, 193, 186; 100/918

[56] References Cited

U.S. PATENT DOCUMENTS

| | | | |
|---|---|---|---|
| 4,156,962 | 6/1979 | Haller | 29/568 |
| 4,462,783 | 7/1984 | Hehl | 425/186 |
| 4,472,127 | 9/1984 | Cyriax et al. | 425/186 |
| 4,515,546 | 5/1985 | Medwed | 425/186 |
| 4,518,338 | 5/1985 | Hehl | 425/186 |
| 4,529,371 | 7/1985 | Nickly | 425/186 |
| 4,544,340 | 10/1985 | Hehl | 425/186 |
| 4,648,825 | 3/1987 | Heel et al. | 425/186 |

*Primary Examiner*—P. W. Echols
*Assistant Examiner*—Irene Cuda
*Attorney, Agent, or Firm*—Cullen, Sloman, Cantor, Grauer, Scott, and Rutherford

[57] ABSTRACT

A method of changing the mold assembly upon a plastic molding machine having fixed and movable platens mounting a mold assembly to be replaced which comprises the steps: positioning the replacement mold assembly upon a floor surface spaced from and in the plane of the fixed platen, aligning an overhead crane with a cable and support track within the plane for reciprocal movements of the crane and positioning the crane to overlie the machine and hooking the cable to the mold assembly. Further steps include disconnecting the fasteners between the mounting plates on the mold assembly and platens and with the platens separated, lifting the mold assembly from the platens and transporting the mold assembly in the platen plane and lowering the mold assembly to the floor surface in alignment with a replacement mold assembly. Additional steps include positioning the crane above the replacement mold assembly and hooking its cable thereto, lifting and transporting the replacement mold assembly into alignment with the machine center line and lowering the replacement mold assembly into registry with the platens with its mounting plates located, centered and supported upon the platens, and with the platens brought together, reconnecting the fasteners between the mounting plates and platens. A molding machine with fixed and movable platens has a separable mold assembly including spaced mounting plates located, centered and supported upon the platens. The support of each mounting plate includes an upwardly tapered guide and support plate secured to each platen and received within a corresponding similarly shaped undercut slot in each mounting plate, and fasteners interconnecting top and bottom portions of the mounting plate with the corresponding platens.

4 Claims, 3 Drawing Sheets

U.S. Patent  Feb. 21, 1989  Sheet 1 of 3  4,805,285
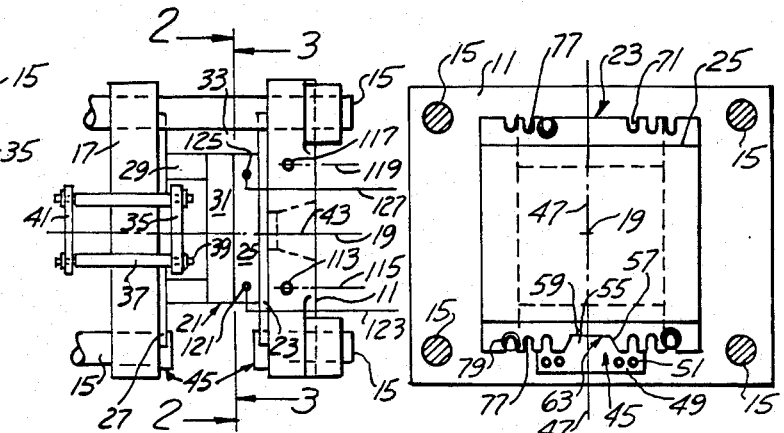
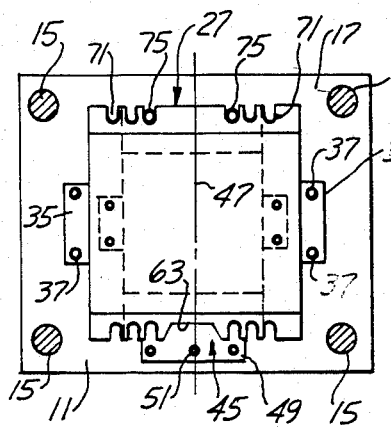
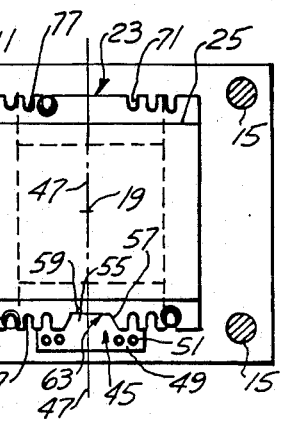
FIG.3    FIG.1    FIG.2
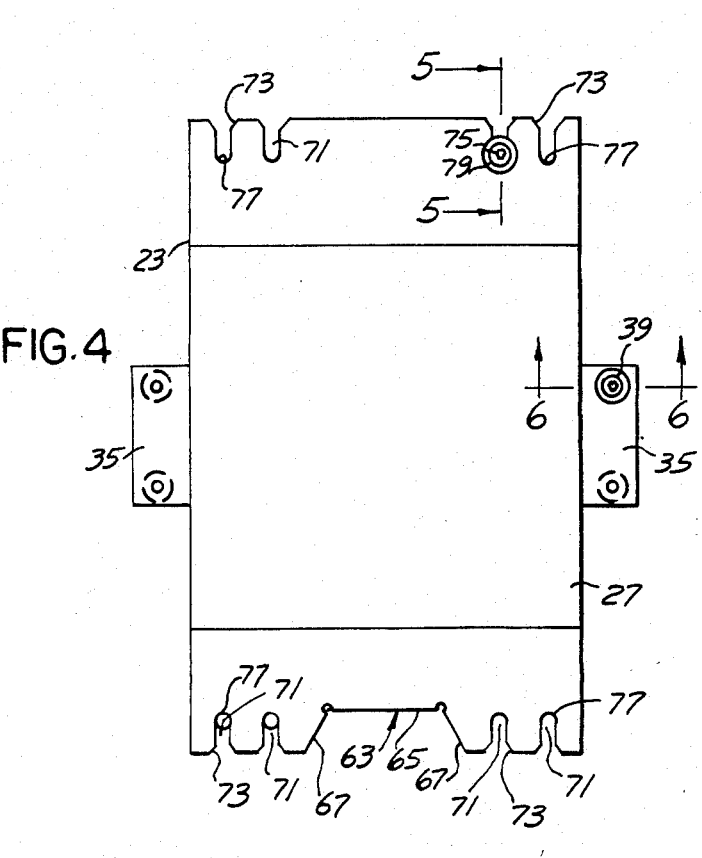
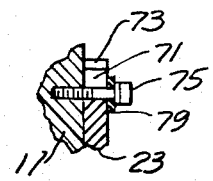
FIG.5
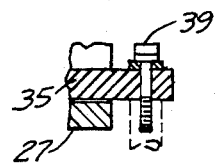
FIG.6

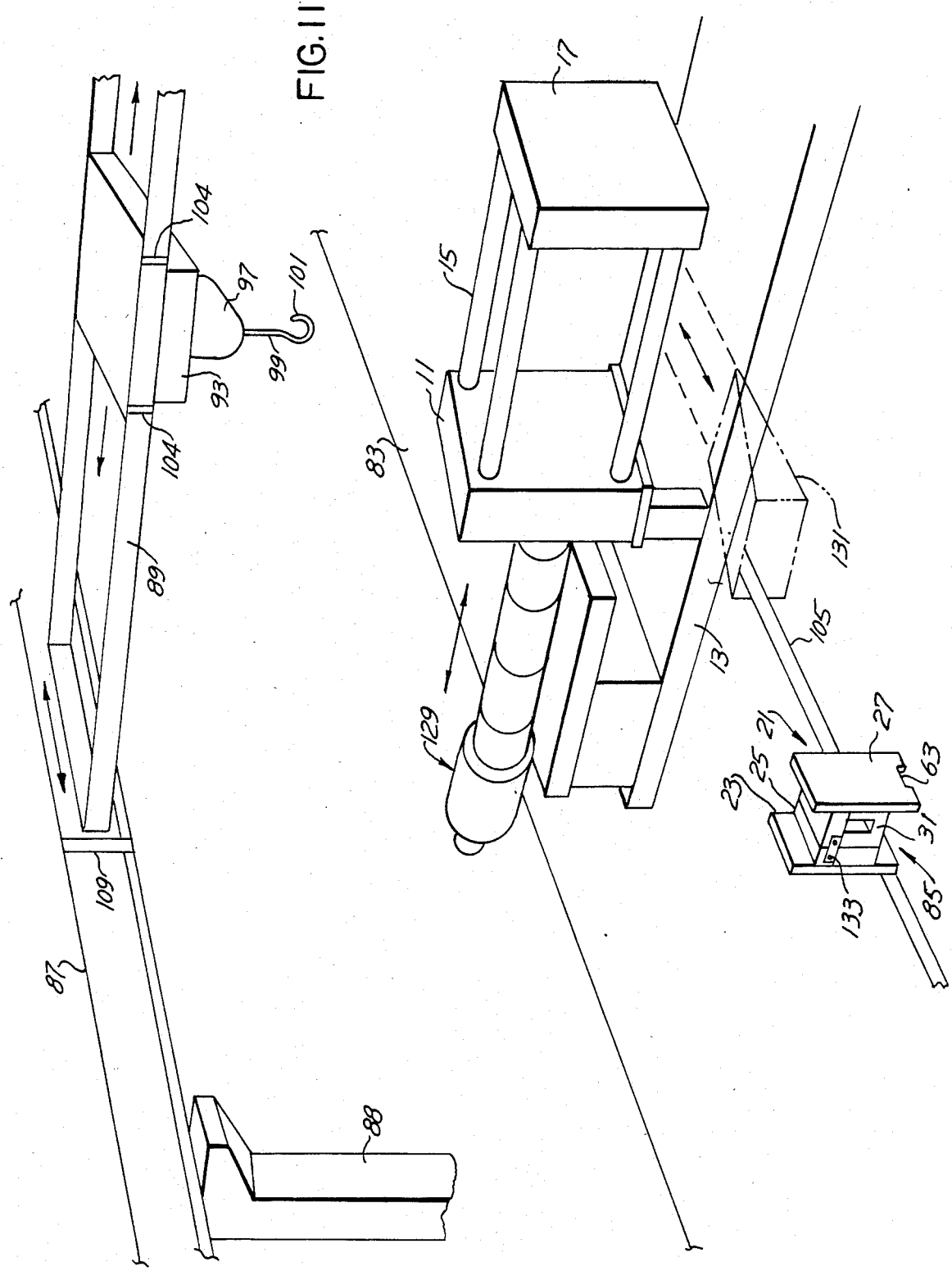

METHOD OF CHANGING INJECTION MOLDS

FIELD OF THE INVENTION

The present invention is directed to a method of changing the mold assembly upon an injection plastic molding machine which has opposed fixed and movable platens which mount the mold assembly to be replaced and wherein the mold assembly is to be removed and replaced by a replacement mold assembly located, centered and secured upon the respective fixed and movable platens of the molding machine and secured thereto.

BACKGROUND OF THE INVENTION

Heretofore, in utilizing a mold assembly upon an injection plastic molding machine having opposed fixed and movable platens on which the mold assembly is mounted and secured, considerable time and effort has been required for removing the mold assembly and providing a replacement therefore for continued operation of the molding machine.

Heretofore, in the replacement of one mold assembly for another, a number of workers are required and considerable time employed in making the removal of a mold assembly from a plastic molding machine using a suitable crane and thereafter locating centering, mounting and securing to the platens of the molding machine a replacement mold for continued operation.

Considerable time is involved in mounting the replacement mold assembly upon the molding machine due to the difficulty of correctly and properly centering and locating the respective mount plates of the mold assembly upon the corresponding fixed and movable platens of the molding machine to which the respective mounting plates must be secured. In the area of utilizing mold assemblies and the replacement thereof upon molding machines, the difficulty in making a replacement and reassembly thereof is involved due to the heavy weight of said mold assemblies in the range of 500 to 700 tons, for example.

Heretofore, in removing a mold assembly from the molding machine after it has been disconnected therefrom, it must be lifted from the machine and transported to a remote area and thereafter a replacement mold assembly lifted, brought back to the molding machine in registry with its centerlines and accurately reassembled onto the respective fixed movable platens of the molding machine and effectively secured thereto.

Heretofore, locating rings have been employed and other alignment mechanism needed for reapplying the replacement mold assembly to the molding machine.

SUMMARY OF THE INVENTION

An important feature of the present invention is to provide an improved method of changing the mold assembly upon an injection molding plastic machine having opposed fixed and movable platens to mount the mold assembly to be replaced upon a vertical centerline and wherein the replacement mold assembly is initially positioned upon a floor surface in a staging area spaced from and in the plane of the fixed platen of the molding machine to facilitate its lifting and transportation and location upon the molding machine.

An important feature is to provide a transversely adjustable overhead crane and support track which may be adjusted within the plane of the fixed platen of the molding machine and with the crane adapted for reciprocal movements in that plane and wherein the crane is adapted for positioning upon the vertical centerline of the molding machine.

An important feature is to provide a crane having a cable and suitable hook for dropping the hook onto the mold assembly for connection therewith, subsequently disconnecting the fasteners between the respective mounting plates on the mold assembly and platens, including the fasteners to the ejector plate, and with the platens partly separated lifting the mold assembly from the platens and thereafter transporting the mold assembly in the said plane and lowering the mold assembly in the said plane to the floor surface of a staging area in an upright position in alignment with the replacement mold assembly.

A further feature includes, as a part of the method, positioning the crane above the replacement mold assembly and hooking its cable thereto and thereafter lifting and transporting the replacement mold assembly into alignment with the machine centerline and thereafter lowering the replacement mold assembly into registry with the molding machine platens with the mounting plates of the mold assembly located, centered and supported upon the platens respectively and with the platens brought together reconnecting the fasteners between the mounting plates and platens.

An important feature includes the further step wherein the transverse crane support tracks are movably mounted upon a pair of crane ways and wherein there is a preliminary step for aligning the overhead crane of color marking the crane support track to visibly assist in the alignment of the crane with respect to the fixed platen plane.

An important feature includes the further preliminary step before positioning the crane upon the vertical centerline of color marking the crane ways adjacent said vertical centerline to visibly assist and position the transverse crane support track upon said vertical centerline.

An important feature includes color marking of the crane ways to visibly assist in positioning the crane directly above the replacement mold assembly, said color marking being at a pre-selected distance from the centerline of the molding machine for positioning the replacement mold assembly upon the floor surface.

An important feature in connection with the present invention is provision of apparatus wherein the plastic molding machine includes a bed having opposed, upright fixed and movable aligned platens having vertical and horizontal centerlines and wherein a separable mold assembly, including laterally aligned cavity and core plates and spaced opposed mounting plates mounting the cavity and core plates are mounted upon and secured to the fixed and movable platens.

A further feature of the present invention is to provide a support for each mounting plate, including a guide plate, centered and secured upon the respective platens and projecting outwardly thereof and wherein the guide plate has an inwardly tapered support which terminates in a flat-top support having a centerline in registry with the vertical centerline of the mounting plates and wherein the bottom edge of each mounting plate has a correspondingly shaped central undercut slot of a shape complimental to the tapered support top support for snugly receiving the support upon the guide plates, and wherein fasteners are employed for securing top and bottom portions of the mounting plates to the platens.

These and other features and objects will be seen from the following specification and claims in conjunction with the appended drawings.

THE DRAWINGS

FIG. 1 is a fragmentary side elevational view of an injection plastic molding machine having a mold assembly mounted thereon in accordance with the present method and apparatus.

FIG. 2 is an elevational view of the fixed platen of the molding machine taken in the direction of arrows 2—2 of FIG. 1.

FIG. 3 is an elevational view of the movable platen of the molding machine taken in the direction of arrows 3—3 of FIG. 1.

FIG. 4 is a front elevational view on an enlarged scale illustrating the mounting plate shown in FIG. 2, and on an increased scale.

FIG. 5 is a fragmentary section taken in the direction of arrows 5—5 of FIG. 4.

FIG. 6 is a fragmentary section taken in the direction of arrows 6—6 of FIG. 4.

FIG. 11 is a schematic perspective view of the molding machine and overhead crane ways.

It will be understood that the above drawings illustrate merely a preferred embodiment of the method and apparatus, and that other embodiments are contemplated within the scope of the claims hereafter set forth.

DETAILED DESCRIPTION OF AN EMBODIMENT OF THE INVENTION

Figure 9:
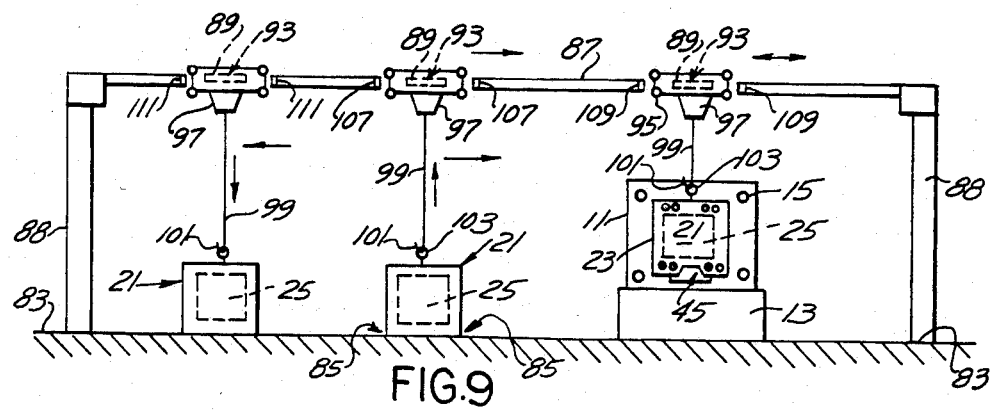
FIG. 9 is a schematic elevational view of the molding machine and the crane apparatus therefore for transporting the replacement mold assembly onto the molding machine.

The molding machine is fragmentarily shown in FIG. 1, including upright fixed platen 11 mounted upon support bed 13, FIG. 9, from which projects a plurality of parallel laterally spaced guide support rods 15 upon which is movably mounted the upright movable platen 17 thereby maintained in lateral alignment with fixed platen 11 and upon the transverse centerline 19.

Mold assembly 21 is removably mounted and secured upon the molding machine upon the respective platens 11 and 17, and includes upright cavity mount plate 23 removably mounted and secured upon fixed platen 11, and supporting cavity plate 25 of conventional construction.

Core mounting plate 27 is removably mounted and secured upon platen 17 and mounts a pair of transverse parallel support blocks 29 across which is positioned core plate 31 in a conventional construction. Conventional parting line 33 is established between cavity plate 25 and core plate 31 and wherein in a conventional manner the respective cavity plate and core plate are adapted for relative movement towards and away from each other and maintained in proper alignment in accordance with the conventional mold assemblies. The upright, rectangular ejector plate 35 is movably positioned between the respective support blocks 29 and rearwardly of core plate 31 and is adapted for movements towards and away from said core plate. In a conventional manner, ejector plate normally has ejector pins connected thereto that normally lie in planes parallel to the central mold assembly axis 19 for functioning in a conventional manner.

A plurality of laterally spaced, vertically aligned knock-out rods 37 extend through movable platen 17, extend to and with reduced portions thereof extending through ejector plate 35 and suitably secured thereto by socket head fasteners 39.

The respective outer ends of the knock-out rods 37 are interconnected by the connectors 41 and in turn connected with a part of the molding machine, not shown, for operation in a conventional manner.

Formed within the stationary platen 11 and arranged upon central axis 19 is the conventional sprue 43, shown in dash lines, which is adapted to receive the molten plastic material for injection into the mold cavities in a conventional manner.

Mounted upon each of the respective platens 11 and 17 and arranged inwardly thereof are the corresponding alignment, centering and locating guides 45 arranged upon the centerline 47 of the respective platens 11 and 17 as in FIGS. 2 and 3, and suitably secured to the corresponding platen by a plurality of fasteners 51, including heads 52 positionable within corresponding recesses in the locating guide together with two or more locating dowels 53.

Figures 7, 8:
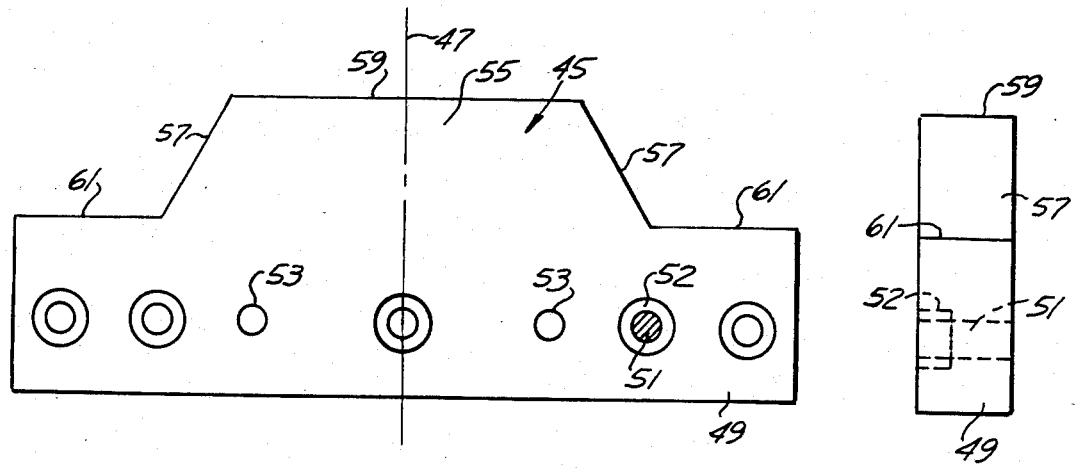
FIG. 7 is a front elevational veiw of the guide plate as mounted upon the fixed platen shown in FIG. 2, and on an increased scale, for centering and locating the mounting plate for a part of the mold assembly.
FIG. 8 is an end elevational view thereof.

Alignment, centering and locating guide 45 of which there is one guide upon each of the respective platens and secured thereto, FIGS. 2 and 3, includes the guide base 49, FIG. 7. Downwardly and outwardly tapered walls 57 are arranged at an angle of approximately 30°+ or −0°, 15 minutes symmetrically with respect to centerline 47. Guide 45 includes the top support 59 and a pair of outwardly arranged side supports 61 at the lower ends of tapered walls 57.

The corresponding mount plates 23 and 27 at their lower ends have formed therein complimentary shaped guide recesses 63, FIG. 2, in order to cooperatively receive, center and locate the corresponding mounting plates 23 and 27 as they are lowered in accordance with the present method into assembly with guide plates 45.

Guide recesses 63 in the mounting plates have a top wall 65, FIG. 4, adapted to receive guide plate top wall 59 and tapered undercut sidewalls 67 adapted to cooperatively receive the corresponding tapered walls 57 of the guide plate and wherein the tapered sidewalls are arranged at a 30° angle approximately + or −0° 15 minutes.

Formed across the lower edge of the respective mounting plates 23 and 27 are a series of downwardly opening fastener slots 71, which are shown in FIG. 4, with outwardly tapered throated openings 73 to guidably receive the corresponding fasteners 75 which are threaded into the corresponding platen to register with the semi-circular end wall 77. Shown in FIGS. 4 and 5, fastening includes the flat washer 79 interposed between socket head fastener 75 and the corresponding mounting plate.

In accordance with the present method, the respective replacement mold assembly 21 is lowered into the molding machine so that the corresponding mounting plates 23 and 27 are in cooperative registry with the guide plates 45. The mounting plates are located and centered with respect to the corresponding platens and thereafter secured thereto by the plurality of fasteners 75, FIGS. 4 and 5.

The respective mounting plates 23, 27 have across their upper ends a corresponding series of laterally spaced upwardly opening slots 71 with tapered entrant openings 73 and into which are projected additional socket headed fasteners 75 with interposed washers 79 for securing upper end portions of the corresponding mounting plates to the corresponding platens.

Figure 10:
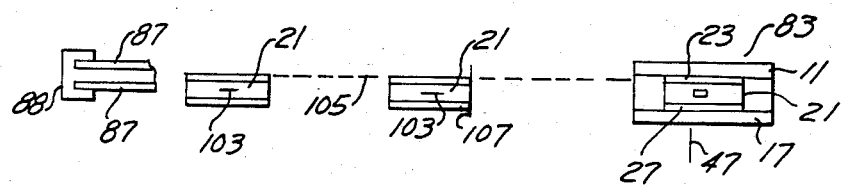
FIG. 10 is a fragmentary plan view thereof.

Referring to FIGS. 9 and 10, there is fragmentarily shown a floor 83 adapted to receive and support bed 13 for the molding machine, FIG. 9. Spaced from the bed 13 upon said floor is a staging area 85 upon which is mounted in an upright position a replacement mold assembly 21 arranged in a plane in alignment with the fixed platen 11 of the molding machine.

A pair of laterally spaced crane ways 87, one of which is shown, are supported on pillars 88, FIG. 11. Transverse crane support tracks 89 span and are movably mounted upon crane ways 87.

Schematically shown upon tracks 89 is a lift crane 93. Crane 93, as schematically shown, FIG. 9, employs a winch 97 with a corresponding cable 99 having a depending hook 101 adapted to interconnect with corresponding upwardly extending eye bolt 103 which projects from central portions of the mold assembly 21, FIGS. 9 and 10.

In order to facilitate the transverse adjustment of the crane 93 upon the support tracks 89 there are provided color marker lines 104, FIG. 11 on visible portions thereof to designate when the crane has been transversely adjusted thereon to a position so as to be in alignment with the plane of stationary platen 11.

Contrasting marking line 105 is applied to staging area 85, FIGS. 10 and 11. Line 105 is of a contrasting color, such as yellow, in registry with a plane passing through the upright inner surface of fixed platen 11 of the molding machine.

There is an additional color marking line 107 upon crane ways 87, FIG. 10, to assist in the positioning of track 89 and crane 93 thereon for locating the replacement mold assembly 21, FIG. 9, so that it rests in the staging area spaced a predetermined distance from the vertical centerline 47 of the platens.

Thus, once the crane 93 has been transversely adjusted up to the transverse markings 104 on the tracks 89, it is known that the crane is in registry with the plane of platen 11.

Transverse contrasting color markings 107 are applied visibly to the overhead track 87 to provide a visible location for the crane directly over the replacement mold assembly 21. The additional visible transverse markings 109 upon crane ways 87 are directly above bed 13 arranged centrally of axis 47 to assure that when the crane is in the position shown in FIGS. 9 and 11 adjacent markings 109, it is directly above mold assembly 21 ready for removal in accordance with the present method once it has been disconnected from the corresponding platens.

There are additional transverse color markings 111 upon crane ways 87 along the length thereof at a predetermined distance from centerline 47 so as to mark the preselected location for track 89 and crane 93 for positioning the crane in such position for lowering the initial mold assembly 21 onto a preselected position in the staging area, FIG. 9.

In accordance with the present method, once the mounting plates of the mold assembly 21 have been mechanically disconnected from the corresponding platens and the platens are partly separated, crane 93 with its winch 97 and cable 99 and hook 101 can lift the mold assembly vertically and transport said mold assembly along crane ways to marking lines 111. At that time the cable is lowered lowering the mold assembly to the staging area, as shown at the left hand side of FIG. 9.

Without repositioning the crane on track 89, it is merely necessary then to move the track 89 back to the markings 107 on crane ways 87 after which the cable is lowered. It is predetermined that the cable and winch will be in registry with the replacement mold assembly 21 upon staging area 85. Once hooked onto the cable it may be lifted by the crane and transported along crane ways 87 without further adjustment of the crane, and subsequently lowered down onto and between the respective platens. According to this construction, the respective mounting plates of the mold assembly 21 register with the corresponding guide and support alignment locating and centering plates 45 on the respective platens and while still secured to the cable are fastened and secured to the corresponding platens as by fasteners 75 at the top and bottom thereof extending through the corresponding slots 71.

Referring to FIG. 1, intake water cooling fitting 113 provided upon the platen 11 connects to a source of pressurized cold water through the conduit 115. A similar exhaust fitting 117 is also applied to the fixed platen 11 and by a suitable exhaust conduit 119 provides a means for carrying away heated water from the cooling step.

Applied to the cavity plate 25 adjacent its top and bottom are the quick disconnect fittings 121 and 125, adapted for quick connect and disconnect from the corresponding conduits 123 and 127 by which when fully assembled and in operation of the molding machine pressurized cooling water can be circulated through the cavity plate 25 and exhausted therefrom in a conventional manner.

It is contemplated that in accordance with the present method, before the mold assembly 21 has been lifted from the molding machine, it is necessary that there be a quick disconnect of the respective connections of the pressure and exhaust pipes 123 and 127 from the intake and exhaust fittings 121 and 125. It is contemplated that the respective core plate 31 may have additional quick disconnect fittings for cooling and for connection to the respective intake and exhaust cooling water connections in a conventional manner.

Accordingly, as is conventional, the respective platens 11 and 17 may have spaced intake and exhaust fittings such as the fittings 113 and 117 as well as the fittings 121 and 125 adapted to receive pressurized water cooling and return lines and wherein there is color coding of the respective intake and exhaust fittings on the platens to facilitate quick disconnect and reconnect of the lines from one mold assembly to the replacement mold assembly in accordance with the present method.

OPERATION

Two set-up men are utilized to complete the mold set. That is normally the case with mold changes in the 500 to 2500 ton molding machine groups. There is some preliminary work required prior to the mold change. First, the replacement mold 21, FIGS. 9 and 11, needs to be placed in staging area 85 in line with fixed platen 11 and in a position marked by yellow line 105 on the staging area 85.

At this time, the overhead crane 93 is aligned with the fixed platen plane by adjustment of crane along track 89. No further movement transversely of the crane is required in that plane. To assist in the initial alignment of the crane, indicating marks 104 are painted upon the tracks 89, FIG. 11.

The next step is to position the crane 93 in the other plane on the center line 47 of the molding machine with the assistance of additional alignment marks 109, FIGS. 9 and 11. At this time, the crane and the mold 21 are set and ready for the mold change. The crane 93 is located above mold 21 that is to be removed from the machine. At this time, the preliminary work is already done and the mold change can now start.

At the end of the injection cycles of the molding machine, the injection unit 129 or sled for the sprue nozzle is backed off while the remainder of the cooling cycle is continuing through the respective cooling lines 115, 123, 119 and 127, for illustration.

At the end of the cooling cycle an after part ejection the machine cycle is interrupted. This time, the mold change is underway and down time of the machine begins.

The machine clamp is activated and then shut-off. Part shute 131 upon the underside of the mold assembly normally mounted upon bed 13 is removed and set aside. The water manifold valves are closed and the water lines 123 and 127 are disconnected from the mold only, for example at the quick disconnect fittings 121 and 125. The remainder of the fittings remain attached to the main water manifolds and the lines 123, 127 are now set to one side. Lowering the crane cable 99 and its hook 101 is connected with the eye bolt 103 upon mold assembly 21. The mold safety straps 133, FIG. 11, are set to hold the mold parts 25 and 31 together on either side of the mold.

Using air impact wrenches the set-up men then untighten the bolts 75 from the top clamps, the ejector plate fasteners 39 and the bolts 75 on the bottom plates of the mold. The machine is started, the clamp decompressed and then opened approximately ¾ of an inch and then shut-off. Then the mold assembly 21 is pulled up from the molding machine and tracks 89 with crane 93 moves in one plane only along crane ways 87. The mold is set down next to the other mold at the color marking 111 on crane ways 87, FIG. 9. The track 89 and the crane is then positioned above the replacement mold 21 adjacent color markings 107 on crane ways 87. The mold assembly 21 is lifted above the centerline of the machine, again using alignment aids marked at 109 on the crane ways.

Mold assembly 21 is then lowered onto the machine bed 13 and located by the guides 45 that are attached permanently to both platens as by the fasteners 51. Guides 45 provide the proper centering and alignment and therefore no locating ring is required. The guides also support the weight of the mold and the crane is only left connected for safety purposes.

The molding machine is then started and the clamp closed and pressure built-up and then the machine is stopped. At this time, impact wrenches are used to tighten all of the bolts 75 at the top and bottom of the mount plates as well as the fasteners 39 to the ejector plate and the clamps are slid into position.

The safety straps 133 are moved to the run position and at this point the mold is completely mounted in the machine. It is noted that by utilizing the machine's ejectors tied to the mold ejector plate 35 by the four bolts 39 and knock-out rods 37, no subsequent hydraulic or electrical connections are necessary. Only the water lines 123 and 127 need be connected. The cable is then removed and the eye bolts 103 are placed in a run position.

The machine is then started and fully opened and again stopped. The water lines can then be connected. It is noted that the ins and outs of the water lines are color coded for easier and faster identification at the quick change connectors 121 and 125. The water manifold valves are then opened and the Sterlco-unit started.

Due to the common shut heights, and ejector plate strokes of this family of molds, no Gemco adjustments are necessary. Also, the similarity of the molds and parts that they produce require only minor adjustment to molding parameters. The part shute 131 is placed on the machine bed. The machine is started and the ejection is checked and the molds inspected for any problems. Low mold protection does not have to be adjusted, however it is checked to verify that it is operational. The machine down time is approximately 15 minutes. The machine needs to be purged only once and the injection sled 129 moved forward, FIG. 11, and the automatic cycle initiated. At this time, the quick change mold is completed. The first molded part should be of good quality.

Having described my invention, reference should now be had to the following claims.

I claim:

1. A method of removing and replacing a mold assembly upon an injection plastic molding machine, said machine having opposed fixed and movable platens mounting a mold assembly and a vertical centerline, comprising the steps of:

positioning a replacement mold assembly in an upright position upon a floor surface in a staging area spaced from and in the plane of the fixed platen;

movably mounting transverse crane support tracks upon overhead crane ways for reciprocal movements longitudinally of the molding machine;

movably positioning an overhead crane having a retractable cable and hook upon the support tracks and aligning the crane with the platen plane;

said crane being adapted for reciprocal movements in said plane;

positioning the support tracks and crane upon the crane ways with the crane located upon said vertical centerline lowering the crane cable and hooking it to the mold assembly;

disconnecting the mold assembly from the platens;

with the platens separated, lifting the mold assembly from the platens and transporting the mold assembly in said plane and lowering the mold assembly in said plane to the floor surface of said staging area in an upright position in alignment with said replacement mold assembly;

positioning the support tracks and crane above the replacement mold assembly and hooking its cable thereto;

lifting and transporting the replacement mold assembly into alignment with the machine center line and lowering the replacement mold assembly into registry with said platens, with its mounting plates located, centered and supported upon said platens respectively;

and with the platens brought together, connecting the replacement mold assembly to said platens.

2. In the method of claim 1, further comprising the preliminary steps of:

marking a contrasting colorline upon the floor surface in a staging area and an alignment with the platen plane to facilitate positioning of said replacement mold assembly in the platen plane;

color marking the crane support tracks to visibly assist in the alignment of the crane with the fixed platen plane;

color marking said crane ways adjacent said vertical center line to visibly assist in positioning said support tracks and crane upon said vertical centerline;

color marking said crane ways to visibly assist in positioning said support tracks and crane directly above said replacement mold assembly; and color marking said crane ways at a preset distance from said vertical centerline to visibly assist in locating said support tracks and crane for positioning the replaced mold assembly upon said floor surface.

3. In the method of claim 1, said mold assembly including a first mounting plate upon which is centered and secured a mold cavity plate and a second mounting plate upon which is centered and secured a matching core plate, with the cavity and core plates maintained in alignment and registry;

and locating, centering and supporting the respective mounting plates upon said fixed and movable platens respectively.

4. In the method of claim 3, said locating, centering and supporting including permanent support guides arranged upon said vertical center line and projecting outwardly of said platens respectively and secured thereto.

* * * * *